July 4, 1961 W. S. PRAEG ET AL 2,990,658
GEAR FINISHING MACHINE
Filed Sept. 14, 1959 3 Sheets-Sheet 1
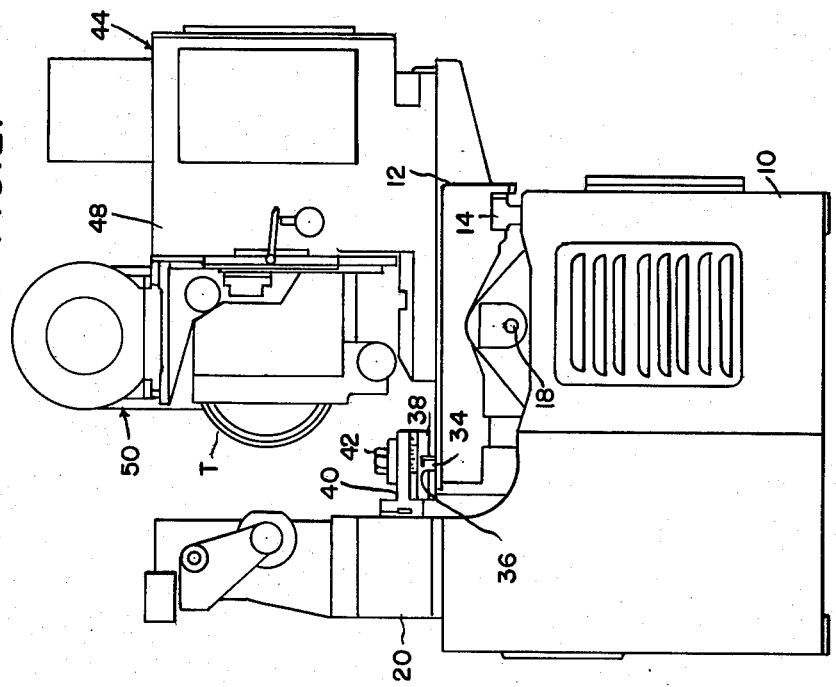
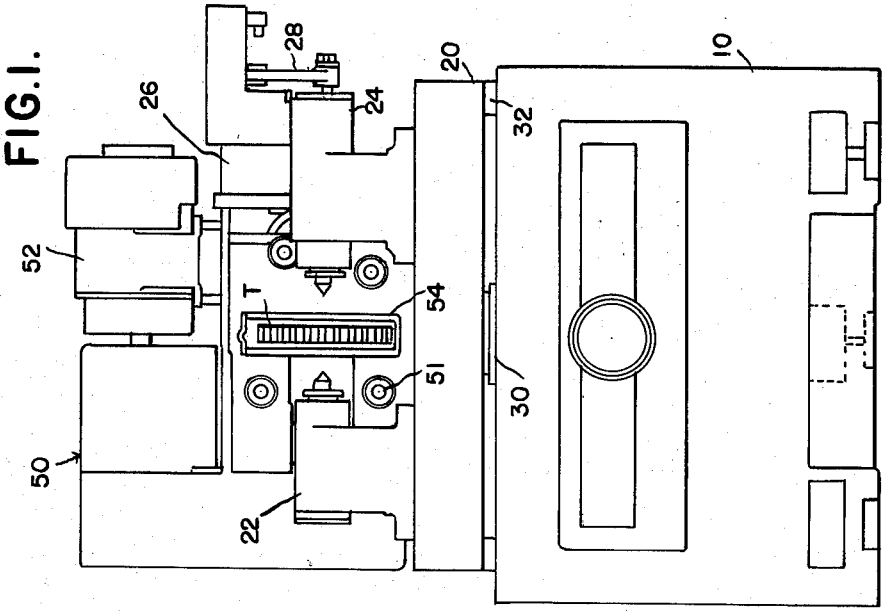
INVENTORS
WALTER S. PRAEG
KENNETH J. DAVIS
ATTORNEYS INVENTORS
WALTER S. PRAEG
KENNETH J. DAVIS
BY Whittemore, Hulbert
& Belknap
ATTORNEYS July 4, 1961 W. S. PRAEG ET AL 2,990,658
GEAR FINISHING MACHINE
Filed Sept. 14, 1959 3 Sheets-Sheet 3
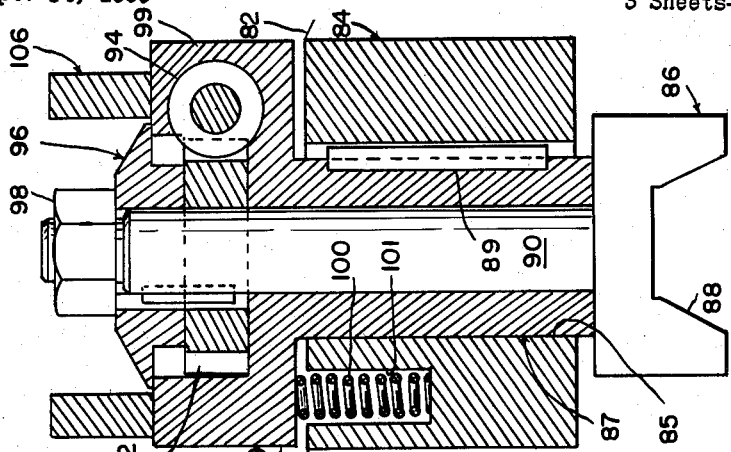
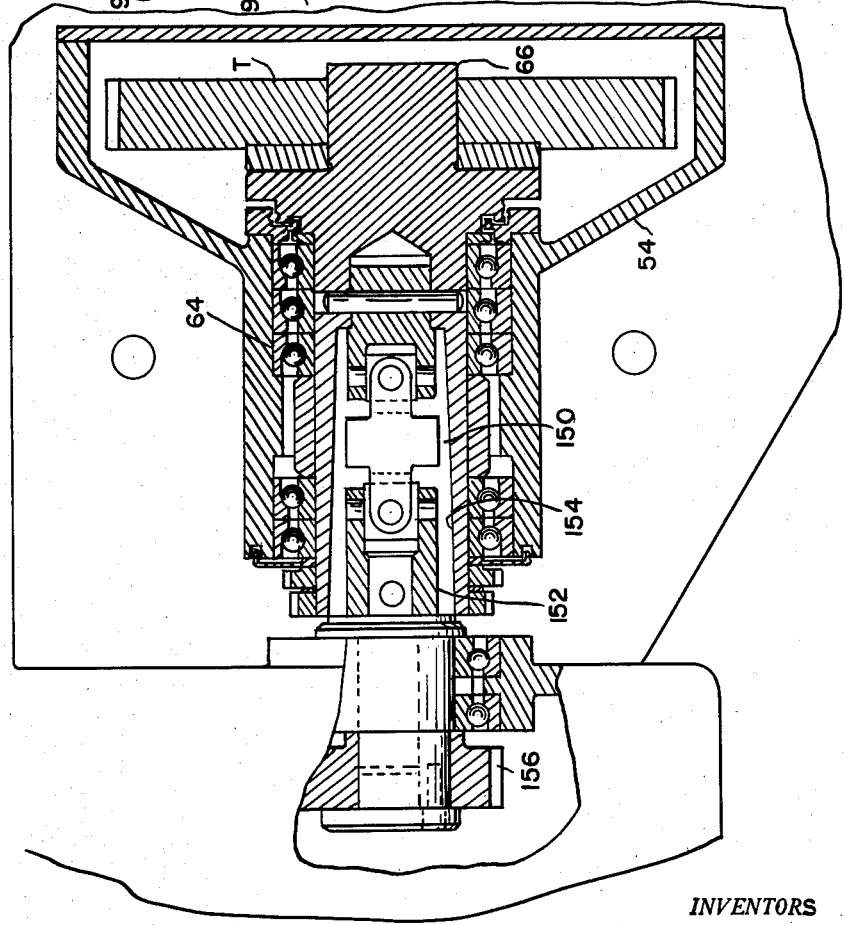
INVENTORS
WALTER S. PRAEG
KENNETH J. DAVIS
ATTORNEYS United States Patent Office 2,990,658
Patented July 4, 1961

2,990,658
GEAR FINISHING MACHINE
Walter S. Praeg and Kenneth J. Davis, Detroit, Mich., assignors to National Broach & Machine Company, Detroit, Mich., a corporation of Michigan
Filed Sept. 14, 1959, Ser. No. 839,792
11 Claims. (Cl. 51—105)

The present invention relates to a gear finishing machine, and more particularly to a machine for honing gears, particularly hardened gears, by running them in mesh, preferably with the axes of the gear and tool crossed in space.

The preferred tool is a honing tool in the form of a gear at least the peripheral toothed portion of which is formed of a hard but slightly yieldable and highly resilient solid resin compound having a multiplicity of abrasive grains embedded therein.

Honing tools of this type are in common and wide spread use at the present time and a further detailed description of these tools is therefore unnecessary. However, it may be noted that the finishing action obtained by running a gear-like honing tool in mesh with a hardened gear is primarily an abrading operation in which inherently material of the honing tool becomes worn away. Actually, tools of the type referred to are astonishingly durable and in some cases operate to finish a great many thousands of hardened steel gears. On the other hand, it is true that material is constantly removed from the surface of the teeth of the hone, and accordingly, as a single hone is used with a succession of gears, the teeth of the hone become worn and as a consequence the center distance between the gear and hone is continuously reduced if the gear and tool are operated in mesh under relative radial pressure.

The crossed axes angle at which the gear and tool mesh is determined nominally by the helix angle of the parts. Thus for example, if a 20 degrees hone is used to finish a spur gear, the nominal crossed axes angle is 20 degrees. Actually, the exactly correct angle at which the axes of the gear and tool are crossed is determined by the center distance between the gear and tool and the crossed axes angle of 20 degrees is exactly correct only for a single particular center distance. Accordingly, as the center distance between the gear and tool is reduced, due to wear or erosion of the tool, the angle at which the axes of the gear and tool should be crossed for perfect conjugate action is changed. While this change in crossed axes setting between the gear and tool is not large, it is nevertheless in many cases an important consideration which if not permitted or provided produces excessive wear of the tool or introduces errors into the teeth of the work gears.

With the foregoing general observations in mind, it is an object of the present invention to provide a gear finishing machine characterized in the provision of means for automatically varying the angle at which the axes of the gear support and tool support are crossed in accordance with the center distance between such axes.

It is a further object of the present invention to provide a gear finishing machine of the type referred to including relatively rotatable work and tool supports, means mounting one of said supports for angular adjustment about an axis perpendicular to and intersecting the axes of both supports, clamping means effective to clamp said one support in a predetermined angular adjusted position, and cam means including an inclined camming surface interposed between said angularly adjustable support and the frame of the machine for effecting angular adjustment of the support as a consequence of movement thereof directly toward and away from the other of said supports.

Other objects and features of the invention will become apparent as the description proceeds, especially when taken in conjunction with the accompanying drawings, illustrating preferred embodiments the invention, wherein:

FIGURE 1 is a front elevation of a gear finishing machine constructed in accordance with the present invention.

FIGURE 2 is a side elevation of the gear finishing machine shown in FIGURE 1.

FIGURE 5 is a fragmentary sectional view on the line 5—5, FIGURE 3.

FIGURE 6 is an enlarged sectional view through the sine bar support mechanism.

Figure 4:
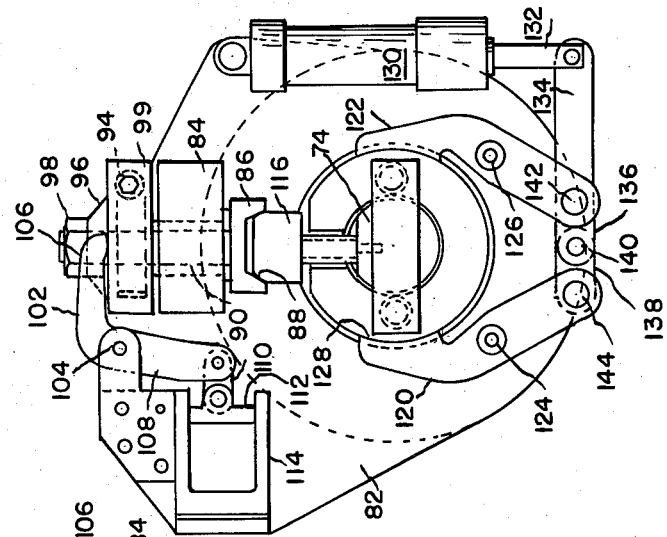
FIGURE 4 is a fragmentary elevational view of the structure shown in FIGURE 3 as viewed from the right.

Referring now to the drawings, the gear finishing machine as a whole is illustrated in FIGURES 1 and 2. The machine comprises a base 10 on which a slide 12 is mounted for movement on ways 14. Drive means such as the feed screw and nut means indicated at 18 extend between the base 10 and slide 12 to provide for traverse of the slide.

Mounted on the base 10 is a work support 20 including a headstock 22 and a tailstock 24. The tailstock 24 is a power tailstock including a center movable toward and away from the center of the headstock by suitable means such as an air cylinder indicated at 26 connected by an arm 28 to the center of the tailstock 24. The work support 20 is mounted for angular adjustment about a vertical axis by pivot means indicated at 30, the axis of which is adapted to extend vertically through and intersect the axis of a work piece supported between the centers of the head and tailstocks. Bearing supports indicated at 32 support the ends of the elongated work support 20.

Means are provided for effecting a rocking movement of the work support about the axis of the pivot means 30 and this comprises a pin 34 carried by the slide 12 which enters into an elongated slot 36 of an angularly adjustable sine bar block 38 carried by an arm 40 extending from adjacent one end of the elongated work support 20. The sine bar block 38 is adjustable and is retained in angularly adjustable position by suitable clamp means such as the nuts indicated at 42. If the sine bar is adjusted in parallelism with the ways 14, traverse of the slide 12 will not rock the work support 20 about the vertical axis of its pivot means 30. If however, the sine bar is adjusted so that the slot 36 extends at an angle with respect to the ways 14, traverse of the slide 12 will result in rocking of the work support in timed relation thereto.

Mounted on the slide 12 for horizontal sliding movement to the right and left as seen in FIGURE 2, is a tool slide 44. The adjustment of the tool slide 44 is to accommodate different size gears and may be effected by a hand operated feed screw and nut combination (not shown).

The tool slide 44 includes a tool column 48 to the front face of which is secured an angularly adjustable tool head indicated generally at 50. The tool head is angularly adjustable about a horizontal axis adapted to intersect and be perpendicular to the axis of a gear and gear-like tool when positioned on the work and tool supports respectively. This adjustment is effected as a preliminary adjustment and is rendered permanent by tightening clamp nuts 51 having portions received in arcuate T-slots.

The tool head includes a drive motor 52 connected through suitable drive gearing to a tool support 54 which receives the gear-like honing tool T. As seen in FIGURES 1 and 2, the tool T is shown as having its axis parallel to the axes of the centers of the work support stocks but in use the tool will normally be positioned with its axis at an angle between 3 and 30 degrees with respect to the axis of the work gear.

Figure 3:
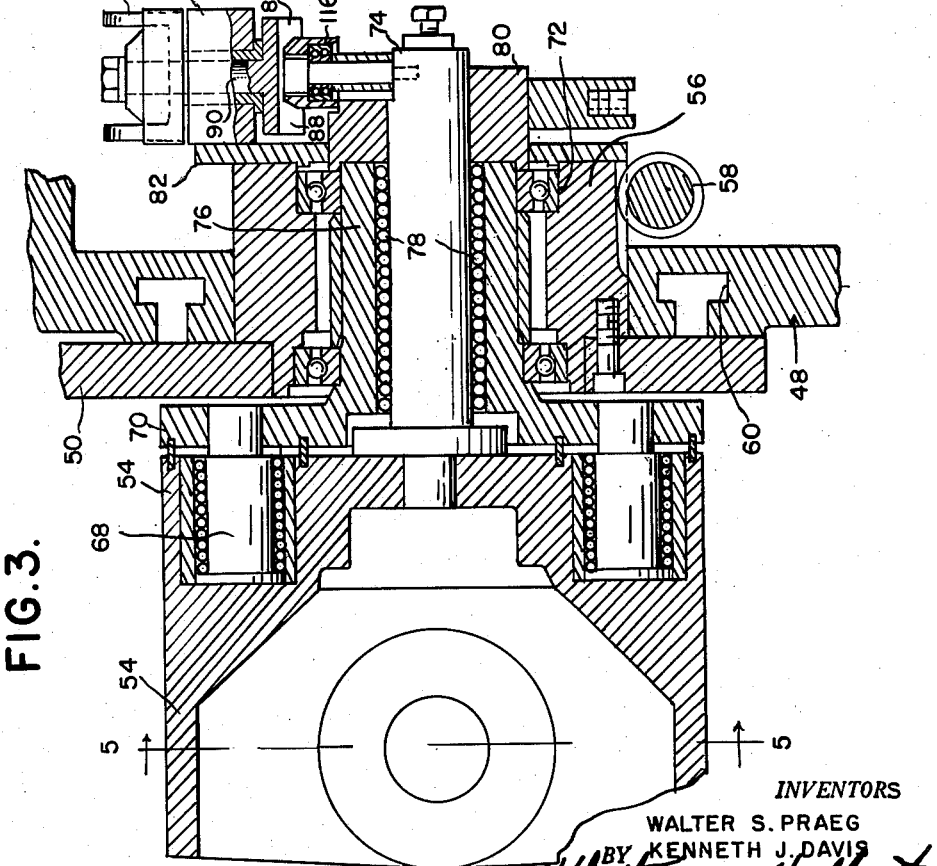
FIGURE 3 is a fragmentary sectional view through a portion of the tool head of the machine.

Referring now more particularly to FIGURES 3–5, the detailed constructions of the tool head and its connection to the tool column 48 will be described. The tool head 50, a portion of which is seen in FIGURE 3, includes an annular pilot 56 provided with gear teeth in mesh with an angle setting adjusting worm 58 carried by the tool column 48. In this figure the T-slots are indicated at 60 and when the clamp nuts 51 are loosened, the entire tool head may be angularly adjusted relative to the tool column, after which the nuts 51 may be tightened to lock the tool head in adjusted position.

This setting of the tool head brings the axis of the honing tool into the desired angular relationship to the axis of a work gear. However, no provision is made by the mechanism so far described for effecting a continuous automatic adjustment of the crossed axes setting.

The machine described includes a relatively light and small tool support 54 provided with bearings 64 supporting a shaft or spindle 66 on which the gear honing tool T is mounted. The tool support 54 as best seen in FIGURE 3, is mounted for limited rectilinear movement in a horizontal direction perpendicular to its axis toward and away from the work support. The means mounting the tool support 54 for this movement and for guiding it, comprise posts 68 extending forwardly from a rotary element 70 which is mounted for rotation by bearings 72 in the pilot 56. In addition, the tool support 54 has extending rearwardly therefrom a stem 74 which is movable longitudinally in a tubular portion 76 of the rotary member 70. Bearings indicated at 78 provide for longitudinal movement of the stem 74 in the bearings 78.

The bearings 72 are retained in position by a combined brake drum and bearing retainer 80 bolted or otherwise connected to the tubular extension 76 of the rotatable member 70.

A plate 82 is bolted or otherwise secured to the inner end of the pilot 56. The plate 82 is thus rotatable with the tool head 50 and carries a part of sine bar mechanism and brake mechanism which will now be described.

Referring more particularly to FIGURES 3, 4 and 6, the plate 82 is shown as having a sine bar support block 84 having a vertical opening 85 extending therethrough. The sine bar 86 is mounted for angular adjustment in a sleeve 87 so that the direction of its straight sided slot 88 may be adjusted as required. The sleeve 87 is keyed as indicated at 89 to the block 84. The sine bar includes the vertically extending stem 90 which is keyed to the adjusting gear 92, the latter being engaged with an adjusting worm 94. The angular adjustment is indicated by a dial 96 also keyed to the stem 90. After the sine bar has been given the required angular adjustment it is locked in position by a nut 98. The sleeve 87 includes a head 99 the underside of which is engaged by a plurality of compression springs 100 located in springs pockets 101 provided in the support block 84. Carried by the plate 82 is a bell crank 102 pivoted as indicated at 104 and having a pair of actuating arms 106 engageable with the head 99 of the sleeve 87. The other arms 108 are connected by a link 110 to the plunger 112 of a solenoid device 114, which when energized moves the arms 106 downwardly to urge the sine bar mechanism into engagement with the follower.

The sine bar follower comprises a follower roller 116 which is connected by a pivot support 118 to the rear end of the tool support stem 74. Accordingly, as the tool support 54 is moved parallel to the axis of its stem 74 relative to the plate 82, the sine bar follower 116 imparts angular adjustment of the tool support 54 about the axis of its stem in accordance with the inclination of the sine bar 86. This rotary adjustment is permitted by corresponding rotation of the rotary element 70 in its bearings 72.

Means are also provided for locking the tool head 54 against angular adjustment about the axis of its stem 74 and this means comprises brake arms 120 and 122 pivoted at 124 and 126 respectively, having brake portions 128 frictionally engageable with the peripheral surface of the braked drum 80. Since the brake drum 80 is rigidly connected to the rotary element 70, operation of the brake holds the rotary element 70 against rotation and prevents angular movement of the tool support 54 about the axis of its stem 74. This is because the guide posts 68 prevent relative angular movement between the rotary element 70 and the tool head 54.

Means are provided for actuating the brake arms and as illustrated, comprise an air cylinder 130 having a piston rod 132 connected to the actuating arm 134 of toggle links 136 and 138 connected together by a pivot connection 140. The toggle link 136 and actuating arm 134 are connected by a pivot connection 142 to the lower end of the brake arm 122, whereas the toggle link 138 is connected by a pivot connection 144 to the lower end of the brake arm 120. When air is admitted to the cylinder 130 moving the piston rod 132 downwardly, the toggle links 136 and 138 urge the lower end of the brake arms apart and thus apply the brake.

The gear finishing machine to which the present invention is applied has means connected to the rear end of the tool support stem 74 for applying a predetermined force to the tool support urging the tool carried thereby into pressure contact with the work gear. Mechanism for accomplishing this result is disclosed in detail in copending Davis application Serial No. 817,405, filed June 1, 1959.

Each gear finishing cycle involves a retraction of the tool support from a work gear which corresponds to movement of the tool support stem 74 to the right as seen in FIGURE 3. After a finished gear has been removed from the machine and a new gear to be finished has replaced it between the head and tailstocks of the work support, the tool head is again advanced with a predetermined force and a gear finishing operation is carried out. The gear finishing operation involves rotation of the gear and tool in mesh accompanied by a relative traverse resulting from movement of the slide 12 in a direction parallel to the axis of the work gear.

The mechanism for effecting a driving rotation of the tool is best illustrated in FIGURE 5 to which attention is now directed. In this figure the tool spindle 66 is connected by a flexible drive coupling 150 to a drive shaft 152 fixedly mounted in the angularly adjustable tool head 50. The movement of the tool support 54 into and out of operative pressure engagement with a work gear is of course in a direction perpendicular to the axis of the spindle 66, and the flexible coupling 150, together with the clearance provided by the hollow interior portion 154 of the spindle permits this movement. The shaft 152 is connected by suitable gears, one of which is indicated at 156, to the motor 52.

The sequence of operation of the mechanism described herein is as follows:

After a new work gear has been mounted in the machine the solenoid 114 is energized forcing the sine bar 86 downwardly into positive contact with the roller 116. At this time the tool head 54 is moved to bring the hone into pressure engagement with the work gear, this movement resulting in movement of the tool support stem 74 to the left as seen in FIGURE 3. This produces relative movement between the roller 116 in the slot 88 of the sine bar and results in a corresponding angular adjustment of the tool support, in accordance with the particular angular setting of the sine bar 86. When the honing tool has been brought into the desired pressure contact with the work at a center distance depending upon the condition of the honing tool, the air cylinder 130 is operated to set the brake including the brake arms 120 and 122, thus locking the tool support 54 against angular movement. The solenoid 114 is then de-energized and the sine bar 86 is retracted by the spring means 100 into a position of clearance. The motor 52 is energized to drive the gear finishing tool in rotation and this rotation is imparted to the work gear due to the meshed engagement therebetween. At the same time the slide 12 is reciprocated to distribute the honing action from end to end of the teeth of the gear. During this operation the tool support 54 may be maintained under constant pressure so that it may move closer to the work gear as material is removed therefrom. Alternatively, it may be locked by suitable means (not shown herein) against further movement toward the work gear during the gear finishing cycle. Upon completion of the gear finishing operation the tool support is retracted, this movement being permitted without interference because of the clearance existing at that time between the sine bar follower 116 and the sine bar 86.

From the foregoing it will be observed that the tool head assembly 50 is mounted for substantial angular adjustment to accommodate gears and tools of different hand and widely different helix angle. The tool head 50 is a part of the tool slide 48 and is movable therewith for the substantial adjustment required to accommodate gears and tools of different size.

The relatively limited rectilinear and angular movements imparted to a portion of the tool head including its spindle are provided as follows: The necessary approach and separation between the tool and work gears during succeeding machining cycles is accomplished by providing for movement of a portion of the tool head including the tool spindle relative to the remainder of the tool head. Specifically, the portion of the tool head including the spindle comprises the tool support 54. The tool support 54 is specifically reciprocable relative to the rotary element 70. Thus, the tool head and rotary element 70 together constitute a second portion of the tool head which is angularly adjustable relative to the remainder of the tool head.

The overall effect of the improvements of the present invention is that as each successive work gear is finished the crossed axes setting between the gear and the hone is each time established at a value dependent upon the center distance at which the gear and hone operate. Thus, as the hone is worn in use with a corresponding reduction in center distance there is at all times a fully automatic and exactly accurate re-adjustment of the crossed axes setting bringing about a theoretically accurate conjugate relationship between the teeth of the gear and hone.

The drawings and the foregoing specification constitute a description of the improved gear finishing machine in such full, clear, concise and exact terms as to enable any person skilled in the art to practice the invention, the scope of which is indicated by the appended claims.

What we claim as our invention is:

1. A gear finishing machine comprising a frame, a work support including a rotary spindle, a tool support including a rotary spindle, means for driving one of said spindles in rotation, means mounting one of said supports on said frame for substantial angular adjustment about an axis perpendicular to and intersecting the axes of said spindles to provide for meshing of gears and gear-like tools of helix angles of different hand and amount, means connecting one of said supports to said frame for adjustment toward and away from the other of said supports to accommodate gears and tools of different sizes, means for traversing one of said supports in a direction which occupies a plane parallel to the axes of both of said spindles, means mounting a first portion of one of said supports including its spindle for limited reciprocation relative to the remainder of said last named support in a direction perpendicular to and intersecting the axes of both of said spindles, means mounting a second portion of said last named support including said first portion and its spindle for limited angular adjustment about an axis perpendicular to and intersecting the axes of both of said spindles, and an adjustable sine bar and follower connected between said second portion of said last named support and the remainder thereof to effect an angular adjustment of the spindle of said last named support upon movement thereof toward and away from the other of said supports.

2. A gear finishing machine comprising a frame, a work support including a rotary spindle, a tool support including a rotary spindle, means for driving one of said spindles in rotation, means mounting one of said supports on said frame for substantial angular adjustment about an axis perpendicular to and intersecting the axes of said spindles to provide for meshing of gears and gear-like tools of helix angles of different hand and amount, means connecting one of said supports to said frame for adjustment toward and away from the other of said supports to accommodate gears and tools of different sizes, means for traversing one of said supports in a direction which occupies a plane parallel to the axes of both of said spindles, means mounting a first portion of one of said supports including its spindle for limited reciprocation relative to the remainder of said last named support in a direction perpendicular to and intersecting the axes of both of said spindles, means mounting a second portion of said last named support including said first portion and its spindle for limited angular adjustment about an axis perpendicular to and intersecting the axes of both of said spindles, an adjustable sine bar and follower connected between said second portion of said last named support and the remainder thereof to effect an angular adjustment of the spindle of said last named support upon movement thereof toward and away from the other of said supports, and brake means connected between the angularly adjustable portions and the remainder of said last named support to lock the spindle of said last named support against angular displacement during a machining cycle.

3. A gear finishing machine comprising a frame, a work support including a rotary spindle, a tool support including a rotary spindle, means for driving one of said spindles in rotation, means mounting one of said supports on said frame for substantial angular adjustment about an axis perpendicular to and intersecting the axes of said spindles to provide for meshing of gears and gear-like tools of helix angles of different hand and amount, means connecting one of said supports to said frame for adjustment toward and away from the other of said supports to accommodate gears and tools of different sizes, means for traversing one of said supports in a direction which occupies a plane parallel to the axes of both of said spindles, means mounting a first portion of one of said supports including its spindle for limited reciprocation relative to the remainder of said last named support in a direction perpendicular to and intersecting the axes of both of said spindles, means mounting a second portion of said last named support including said first portion and its spindle for limited angular adjustment about an axis perpendicular to and intersecting the axes of both of said spindles, an adjustable sine bar and follower connected between said second portion of said last named support and the remainder thereof to effect an angular adjustment of the spindle of said last named support upon movement thereof toward and away from the other of said supports, means for separating the sine bar and follower following angular adjustment of the spindle of said last named support as a consequence of movement thereof toward the other of said supports, and brake means connected between the angularly adjustable portions and the remainder of said last named support to lock the spindle of said last named support against angular displacement during a machining cycle.

4. A gear finishing machine comprising a frame, a work support including a rotary spindle, a tool support including a rotary spindle, means for driving one of said spindles in rotation, means mounting one of said supports on said frame for substantial angular adjustment about an axis perpendicular to and intersecting the axes of said spindles to provide for meshing of gears and gear-like tools of helix angles of different hand and amount, means connecting one of said supports to said frame for adjustment toward and away from the other of said supports to accommodate gears and tools of different sizes, means for traversing one of said supports in a direction which occupies a plane parallel to the axes of both of said spindles, means mounting a first portion of one of said supports including its spindle for limited reciprocation relative to the remainder of said last named support in a direction perpendicular to and intersecting the axes of both of said spindles, means mounting a second portion of said last named support including said first portion and its spindle for limited angular adjustment about an axis perpendicular to and intersecting the axes of both of said spindles, an adjustable sine bar and follower connected between said second portion of said last named support and the remainder thereof to effect an angular adjustment of the spindle of said last named support upon movement thereof toward and away from the other of said supports, means for separating the sine bar and follower following angular adjustment of the spindle of said last named support as a consequence of movement thereof toward the other of said supports, and brake means connected between the angularly adjustable portions and the remainder of said last named support to lock the spindle of said last named support against angular displacement during a machining cycle, the second portion of said last named support comprising an angularly adjustable plate on which the said first portion is reciprocable.

5. A gear finishing machine comprising a frame, a work support including a rotary spindle, a tool support including a rotary spindle, means for driving one of said spindles in rotation, means mounting said tool support on said frame for substantial angular adjustment about an axis perpendicular to and intersecting the axes of said spindles to provide for meshing of gears and gear-like tools of helix angles of different hand and amount, means connecting said tool support to said frame for adjustment toward and away from said work support to accommodate gears and tools of different sizes, means for traversing said tool support in a direction which occupies a plane parallel to the axes of both of said spindles, means mounting a first portion of said tool support including its spindle for limited reciprocation relative to the remainder of said tool support in a direction perpendicular to and intersecting the axes of both of said spindles, means mounting a second portion of said tool support including said first portion and its spindle for limited angular adjustment about an axis perpendicular to and intersecting the axes of both of said spindles, and an adjustable sine bar and follower connected between said second portion of said tool support and the remainder thereof to effect an angular adjustment of the spindle of said tool support upon movement thereof toward and away from said work support.

6. In a machine for finishing gears, tool supporting and driving structure comprising a column, a tool head mounted on said column for angular adjustment about a horizontal axis, a motor carried by said head, an element mounted on said head for limited angular adjustment, a tool support including a spindle mounted on said element for limited reciprocation relative thereto, a sine bar and follower connected between said tool support and tool head, and means connecting said element and tool support to prevent relative angular adjustment therebetween, whereby limited reciprocation of said tool support relative to said element causes relative angular adjustment of said tool support and said element relative to said tool head.

7. In a machine for finishing gears, tool supporting and driving structure comprising a column, a tool head mounted on said column for angular adjustment about a horizontal axis, a motor carried by said head, an element mounted on said head for limited angular adjustment, a tool support including a spindle mounted on said element for limited reciprocation relative thereto, a sine bar and follower connected between said tool support and tool head, means connecting said element and tool support to prevent relative angular adjustment therebetween, whereby limited reciprocation of said tool support relative to said element causes relative angular adjustment of said tool support and said element relative to said tool head, and a brake connected between said element and tool head.

8. In a machine for finishing gears, tool supporting and driving structure comprising a column, a tool head mounted on said column for angular adjustment about a horizontal axis, a motor carried by said head, an element mounted on said head for limited angular adjustment, a tool support including a spindle mounted on said element for limited reciprocation relative thereto, a sine bar and follower connected between said tool support and tool head, means connecting said element and tool support to prevent relative angular adjustment therebetween, whereby limited reciprocation of said tool support relative to said element causes relative angular adjustment of said tool support and said element relative to said tool head, means for separating said sine bar and follower, and a brake connected between said element and tool head.

9. In a machine for finishing gears, tool supporting and driving structure comprising a column, a tool head mounted on said column for angular adjustment about a horizontal axis, a tool support including a tool spindle mounted on said head for limited reciprocation in a direction perpendicular to the axis of said spindle and for limited angular adjustment about an axis perpendicular to the axis of said spindle, and a sine bar and follower connected between said tool support and head and operable to effect limited angular adjustment of said support upon limited reciprocation thereof.

10. In a machine for finishing gears, tool supporting and driving structure comprising a column, a tool head mounted on said column for angular adjustment about a horizontal axis, a tool support including a tool spindle mounted on said head for limited reciprocation in a direction perpendicular to the axis of said spindle and for limited angular adjustment about an axis perpendicular to the axis of said spindle, a sine bar and follower connected between said tool support and head and operable to effect limited angular adjustment of said support upon limited reciprocation thereof, and a brake connected between said head and tool support.

11. In a machine for finishing gears, tool supporting and driving structure comprising a column, a tool head mounted on said column for angular adjustment about a horizontal axis, a tool support including a tool spindle mounted on said head for limited reciprocation in a direction perpendicular to the axis of said spindle and for limited angular adjustment about an axis perpendicular to the axis of said spindle, a sine bar and follower connected between said tool support and head and operable to effect limited angular adjustment of said support upon limited reciprocation thereof, said sine bar and follower being relatively movable into and out of contact with each other, and a brake connected between said head and tool support to lock said tool support in the position of angular adjustment attained by operation of said sine bar and follower.

References Cited in the file of this patent

UNITED STATES PATENTS 2,232,408    Shaw ------------------ Feb. 18, 1941